(12) United States Patent
Fan et al.

(10) Patent No.: US 9,052,329 B2
(45) Date of Patent: Jun. 9, 2015

(54) TIRE DETECTION FOR ACCURATE VEHICLE SPEED ESTIMATION

(75) Inventors: Zhigang Fan, Webster, NY (US); Wencheng Wu, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 525 days.

(21) Appl. No.: 13/463,769

(22) Filed: May 3, 2012

(65) Prior Publication Data

US 2013/0294643 A1 Nov. 7, 2013

(51) Int. Cl.
G06K 9/00 (2006.01)
G01P 3/38 (2006.01)
G01P 3/68 (2006.01)
G06T 7/00 (2006.01)
G06T 7/20 (2006.01)

(52) U.S. Cl.
CPC ... G01P 3/38 (2013.01); G01P 3/68 (2013.01); G06T 7/0044 (2013.01); G06T 7/0051 (2013.01); G06T 7/2033 (2013.01); G06T 2207/10016 (2013.01); G06T 2207/30236 (2013.01); G06T 2207/30241 (2013.01)

(58) Field of Classification Search
None
See application file for complete search history.

(56) References Cited

U.S. PATENT DOCUMENTS

2013/0202197 A1* 8/2013 Reeler et al. ............. 382/154
2014/0232566 A1* 8/2014 Mimeault et al. ......... 340/935

FOREIGN PATENT DOCUMENTS

GB 2 342 800 4/2000
WO 2007/048796 5/2007

* cited by examiner

Primary Examiner — Atiba O Fitzpatrick
(74) Attorney, Agent, or Firm — MH2 Technology Law Group LLP

(57) ABSTRACT

In some aspects of the present application, a computer-implemented method for determining the speed of a motor vehicle in a vehicle speed detection system is disclosed. The method can include receiving a plurality of images of a motor vehicle traveling on a road, each of the images being separated in time by a known interval; determining, for each of at least two of the images, a point of contact where a same tire of the vehicle contacts a surface of the road based, in part, on one or more identified features of the vehicle in one or more of the plurality of images; and using the points of contact and the time interval separations to calculate a speed at which the vehicle is traveling on the road.

18 Claims, 13 Drawing Sheets

 
FIG. 8A    FIG. 8B
FIG. 9
      
FIG. 10A   FIG. 10B   FIG. 10C

TIRE DETECTION FOR ACCURATE VEHICLE SPEED ESTIMATION

FIELD OF THE DISCLOSURE

The present application is directed to systems and methods for determining a speed of a vehicle by tracking vehicle features in a sequence of images captured over a known time interval or frame rate.

BACKGROUND OF THE DISCLOSURE

Methods for vehicle speed detection using video have many important transportation applications. For applications such as traffic speed enforcement, accurate speed detection is necessary. One method for determining a vehicle's speed is to capture two time-sequenced images of that vehicle, track a specific feature on that vehicle such as, for example, a location of the vehicle's license plate, and then calculate the vehicle's speed from trigonometric relationships. For accurate speed determination, the precise height above the road surface of the feature being tracked needs to be known in advanced, unless a stereo imaging system is used, wherein pairs of images from two different positions are captured. Unfortunately, vehicle features are not placed at fixed heights across all vehicle makes and models. Moreover, since video images are 2D representations of the 3D world, many points in real space map to a single point on the video image. Consequently, unless the camera is mounted at the same height above the road surface as the vehicle feature (or alternatively, at a much higher location above the ground, e.g. aerial view), the speed calculated is highly dependent on the height of the feature above the road.

A typical video speed detection system can be mounted on a pole or gantry anywhere from about 12 feet and about 25 feet above the road surface. Therefore, the height of the feature needs to be accurately known in order to perform height-compensation to the calculated speed. For example, a tracked feature which is 2 ft above the ground, the speed error due to ignoring the height is equal to 17% (2/12) or 8% (2/25) if camera is mounted 12 ft or 25 ft above the ground, respectively. In order to achieve 1% accuracy, the tracked feature height would need to be known to within about an inch or two in typical use conditions. Unfortunately, there is no standard vehicle feature that is at a fixed height for vehicles of all types, makes and models. As such, speeds calculated by analyzing non-stereo images taken of moving vehicles tend to lack the accuracy required for law enforcement.

One way of avoiding this problem is to select a feature which is at "zero height," which is typically the interface between the tires and the road. The challenge to this is the detection reliability, as the contrast between the tires and the pavement is typically very low, because both materials exhibit high absorbances at visible or near-IR wavelengths. This problem is further complicated by shadows in the region of interest. Even with image enhancement (as shown in FIG. 2b), the signal is still very weak.

Attempts have been proposed to overcome this difficulty by using infrared cameras operating at selected wavelengths, where tires and road asphalt show different absorbance features (e.g., a two-band camera system operating at 5.5 µm and 6.4 µm). This may enhance the image contrast; however, the camera system required is non-conventional and would likely be costly.

Accordingly, what is needed are improved systems and methods for analyzing images of moving vehicles to determine the vehicle's speed that overcome the difficulties of the conventional approaches.

SUMMARY OF THE DISCLOSURE

In accordance with some aspects of the present disclosure, a computer-implemented method for determining the speed of a motor vehicle in a vehicle speed detection system is disclosed. The method can comprise receiving a plurality of images of a motor vehicle traveling on a road, each of the images being separated in time by a known interval; determining, for each of at least two of the images, a point of contact where a same tire of the vehicle contacts a surface of the road based, in part, on one or more identified features of the vehicle in one or more of the plurality of images; and using the points of contact and the time interval separations to calculate a speed at which the vehicle is traveling on the road.

In some aspects, the determining the point of contact can comprise determining a first two-dimensional estimated position at a first time at which a tire of the vehicle contacts a surface upon which it is situated in a first frame of a video image taken with a camera; calculating a first three-dimensional position at the first time based on the two-dimensional position using a geometry of the camera with respect to the vehicle; determining a second two-dimensional estimated position at a second time at which the tire of the vehicle contacts the surface in a second frame of the video image; calculating a second three-dimensional position at the second time based on the second two-dimensional position using the geometry of the camera with respect to the vehicle; and determining the estimated speed at which the vehicle is traveling using the first and the second three-dimensional positions and a time difference between which the first and the second two-dimensional positions were estimated.

In some aspects, the method can include determining a first edge, a second edge, or both the first edge and the second edge of the tire to determine the first two-dimensional estimated position.

In some aspects, the method can include determining a position of a license plate, a light fixture, or both the license plate and the light fixture of the vehicle.

In some aspects, the first two-dimensional estimated position can be determined based, at least in part, on the position of the license plate, the light fixture, or both the license plate and the light fixture of the vehicle.

In some aspects, the camera can be operable to detect radiation in a near infrared portion of the spectrum.

In some aspects, the images comprise any of: still images captured at known time intervals, and video images captured at a known frame rate.

In some aspects, the method can include calibrating the camera such that pixel locations of the captured images are known relative to real world coordinates.

In some aspects, the method can include analyzing more than two images of the vehicle using contact points determined for each of a plurality of images over a plurality of time intervals; and determining at least one of a mean speed, a median speed, a maximum speed and a minimum speed, for the vehicle from the analysis of more than two images.

In some aspects, the method can include determining a time-varying speed for the vehicle using at least some of the images.

In accordance with aspects of the present disclosure, a system for determining the speed of a motor vehicle in a vehicle speed detection system is disclosed. The system can include an imaging system; and a processor in communication with said video camera system and a memory, said processor executing machine readable instructions for performing: receiving images captured using the imaging system, each of the images being separated in time by a known interval; determining, for each of at least two of the images, a point of contact where a same tire of the vehicle contacts a surface of the road; using the points of contact and the time interval separations to calculate a speed at which the vehicle is traveling on the road.

In accordance with aspects of the present disclosure, a computer implemented method for determining the speed of a motor vehicle in a vehicle speed detection system is disclosed. The method can include receiving a plurality of images of a moving vehicle, the images captured at known time intervals with each of the images being separated in time by a known interval, said images having been captured using an imaging system; determining, for each of at least two of the images, a point of contact where a same tire of the vehicle contacts a surface of the road; using the points of contact and the time interval separations to calculate a speed at which the vehicle is traveling on the road.

In some aspects, the method can include calibrating the camera such that pixel locations of the captured images are known relative to real world coordinates.

In some aspects, the method can include calculating a plurality of speeds for the vehicle using contact points determined for each of a plurality of images over a plurality of time intervals; and determining an average speed for the vehicle from the plurality of speeds.

In some aspects, the method can include determining a time-varying speed for the vehicle using at least a portion of the plurality of images.

Additional embodiments and advantages of the disclosure will be set forth in part in the description which follows, and can be learned by practice of the disclosure. The embodiments and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

BRIEF DESCRIPTION OF THE DRAWINGS

FIGS. 5a, 5b, and 5c, shows two example near IR images captured at different times of a moving target vehicle using the system of FIGS. 3 and 4.

FIGS. 8a and 8b shows an example image and a model of the bottom part of a tire, respectively, in accordance with aspects of the present disclosure.

FIG. 9 shows another example image of the bottom part of a tire in accordance with aspects of the present disclosure.

FIG. 10, which is a series of three related FIGS. 10a, 10b, and 10c, shows templates used in the tire detection in accordance with aspects of the present disclosure.

FIG. 14, which is a series of three related

DESCRIPTION OF THE EMBODIMENTS

Reference will now be made in detail to various exemplary embodiments of the present application, examples of which are illustrated in the accompanying drawings. Wherever possible, the same reference numbers will be used throughout the drawings to refer to the same or like parts.

What is disclosed is a system and method which detects and uses a point of contact between a vehicle's tire and the road surface for accurate speed detection. The present method uses an image algorithm to detect the interface between tire and asphalt for contact-point detection thus reducing the above-described problem with respect to feature height variation across vehicles to a "zero height" thereby eliminating the trigonometric calculations for height correction altogether. In some aspects, the system and method can use NIR (Near IR) and/or visual light. For example, but not limited to, NIR bands that can be use include bands such as 780 nm, or 850 nm. The use of NIR, in combination with or separate from visible light, allows the system and method to work at a variety of lighting conditions, including low light conditions and at night. As described herein in greater detail, aspects of the present disclosure effectuate accurate real-time vehicle speed detection via image analysis.

One embodiment of the present disclosure for determining the speed of a motor vehicle involves the following. First, a plurality of images of a moving vehicle is captured using a near infrared imaging system. A point of contact is determined in each of the images where a same tire of the vehicle meets the road. Contact points and time interval separations between successive images are determined and then used to calculate a speed at which the vehicle is traveling. In another embodiment, the detected point of contact is used in conjunction with the camera calibration information to determine the height of the tracked feature (e.g. license plate); and then the determined height is further used to refine the raw speed calculated from trajectory of tracked feature. In some aspects, an alert signal can be provided to a traffic enforcement authority if the vehicle's speed exceeds the speed limit set for that road. Other features and advantages of the above-described method will become readily apparent from the following detailed description and accompanying drawings.

Figure 1:
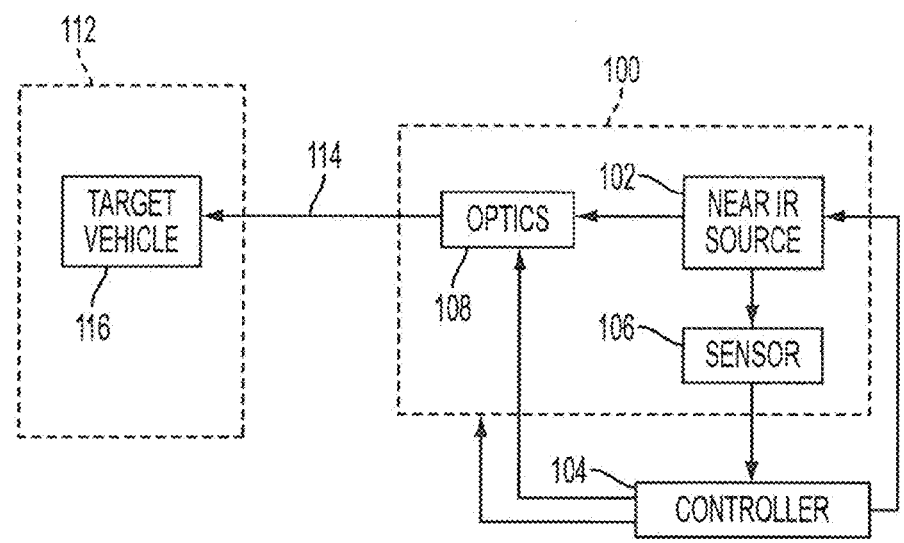
FIG. 1 illustrates one embodiment of an example near IR illumination system in accordance with aspects of the present disclosure.

FIG. 1 illustrates one embodiment of an example illumination system. It should be readily apparent to one of ordinary skill in the art that the system depicted in FIG. 1 represents a generalized schematic illustration and that other components/devices can be added, removed, or modified.

Referring to FIG. 1, the illumination system is shown comprising an illuminator 102, which may comprise narrow-band sources such as light emitting diodes (LEDs), and/or a broadband source, such as a thermal source. Controller 104 is coupled to source 102 and controls the input current and, thereby, the output intensity. Sensor 106 samples the radiation emitted from the light source and provides feedback to controller 104. Optics 108 receives the output of illuminator 102 and focuses output beam 114 onto the target field of view 120, which may include the target vehicle 116. Optics 108 includes a plurality of lens positioned in the beam path to focus the beam as desired, and optionally also contains wavelength-band filters. Controller 108 may also be coupled to optics 108 to effectuate focusing and/or filter placement. Controller 108 optionally can be further coupled to illumination system 100 to effectuate aiming of the device (pan, tilt, etc.).

Figure 2:
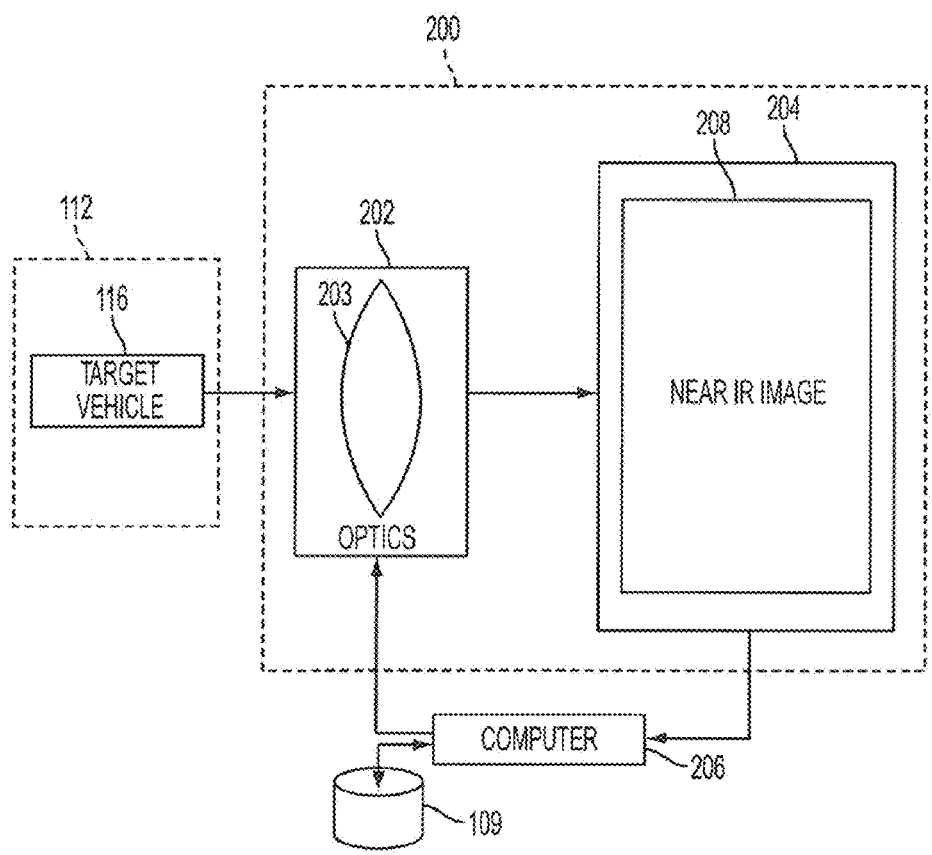
FIG. 2 illustrates one embodiment of an example near IR detection system in accordance with aspects of the present disclosure.

FIG. 2 illustrates one embodiment of an example detection system. It should be readily apparent to one of ordinary skill in the art that the system depicted in FIG. 2 represents a generalized schematic illustration and that other components/devices can be added, removed, or modified.

Referring to FIG. 2, target field of view 120, which may include the target vehicle 116, reflects the output beam 114 emitted by the illumination system of FIG. 1. A portion of the reflected light is received by optics 202 having lens 203 that focus the received light onto sensor(s) 204, which spatially resolve the received light to obtain image 208. Optics 202 may also include one or more bandpass filters that only allow light in a narrow wavelength band to pass through the filter. The filters may also be sequentially changed. Sensor 204 sends the image information to computer 206 for processing and storage. Detector 208 is a multispectral image detection device whose spectral content may be selectable through a controller (not shown). Detector 204 records light intensity at multiple pixel locations along a two dimensional grid. Optics 202 and detector 204 include components commonly found in various streams of commerce. Suitable sensors include charge-coupled device (CCD) detectors, complementary metal oxide semiconductors (CMOS) detectors, charge-injection device (CID) detectors, vidicon detectors, reticon detectors, image-intensifier tube detectors, pixilated photo-multiplier tube (PMT) detectors, InGaAs (Indium Gallium Arsenide), Mercury Cadmium Telluride (MCT), and Microbolometer. Computer 206 receives signal values associated with each pixel of image 208. Computer 206 may optionally be in communication with optics 202 to control the lens thereof and in communication with detector 204 to control the sensitivity thereof. Computer 206 may optionally control the detection system 100 to effectuate aiming of the device (pan, tilt, etc.). In the case of a system capturing a series of still images, computer 206 also controls optics 202 and/or detector 204 to determine when the still images are to be captured.

The illumination system of FIG. 1 and the detection system of FIG. 2, collectively comprise an camera system. One or more such camera systems comprise an imaging system used to capture still or video images of a same tire of a target motor vehicle. The imaging system can be a single video camera operable to capture multiple frames of a moving vehicle, or one or more still cameras capable of being triggered to capture multiple images of the vehicle as the vehicle passes through the camera's field of view. The image captured by each camera can have a time stamp associated therewith.

Figure 3:
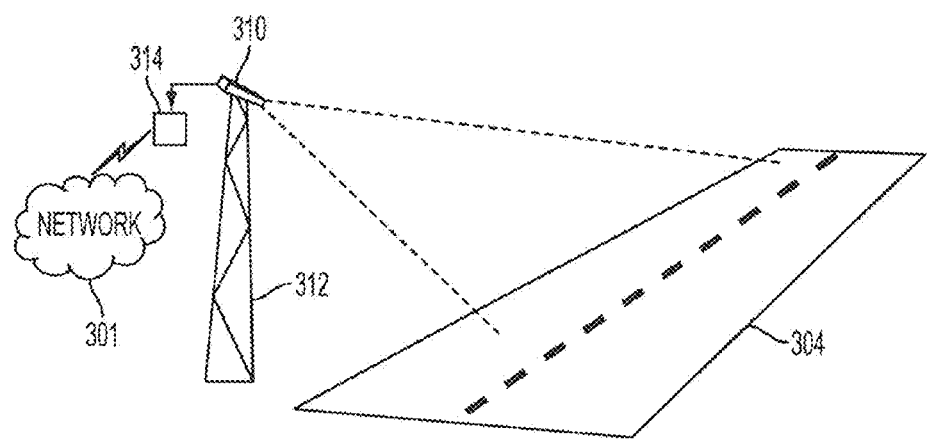
FIG. 3 illustrates one example embodiment of the deployment of a near IR imaging system in accordance with aspects of the present disclosure.

FIG. 3 illustrates one example embodiment of the deployment of an imaging system. It should be readily apparent to one of ordinary skill in the art that the system depicted in FIG. 3 represents a generalized schematic illustration and that other components/devices can be added, removed, or modified.

Referring to FIG. 3, motor vehicles (not shown) travel along road 304. Positioned alongside road 304 or directly above the road (not shown) is an IR camera system 310, which may be mounted on a post, gantry, or similar structure 312. The camera system 310 is capable of capturing still or video images of a motor vehicle as the vehicle passes into the camera's field of view. Also shown associated with the camera is a controller 314. The controller and camera of FIG. 3 are in communication with one or more remote devices such as, for instance, a workstation (of FIG. 4) over network 301. Such communication may be wired or wireless. Various devices can also be placed in communication with any of the controllers of FIG. 3 over network 301 so that various aspects of the controllers such as timing signals, sensitivity settings, and the like, can be monitored, modified, or otherwise controlled. Such devices may also be placed in bi-directional communication with the camera of FIG. 3 using network 301 such that various aspects of the cameras such as the camera angle, tilt, rotation, field of view, lens speed, focus, and the like, can also be monitored, modified, or otherwise controlled, including receiving the images captured by such devices. In one embodiment, controller 314 may include a computer to perform some of the functions of analyzing the images and determining the speed of target vehicles passing by, using the disclosed method. In another embodiment, the analysis of images may be processed elsewhere through the networked computers mentioned below.

Figure 4:
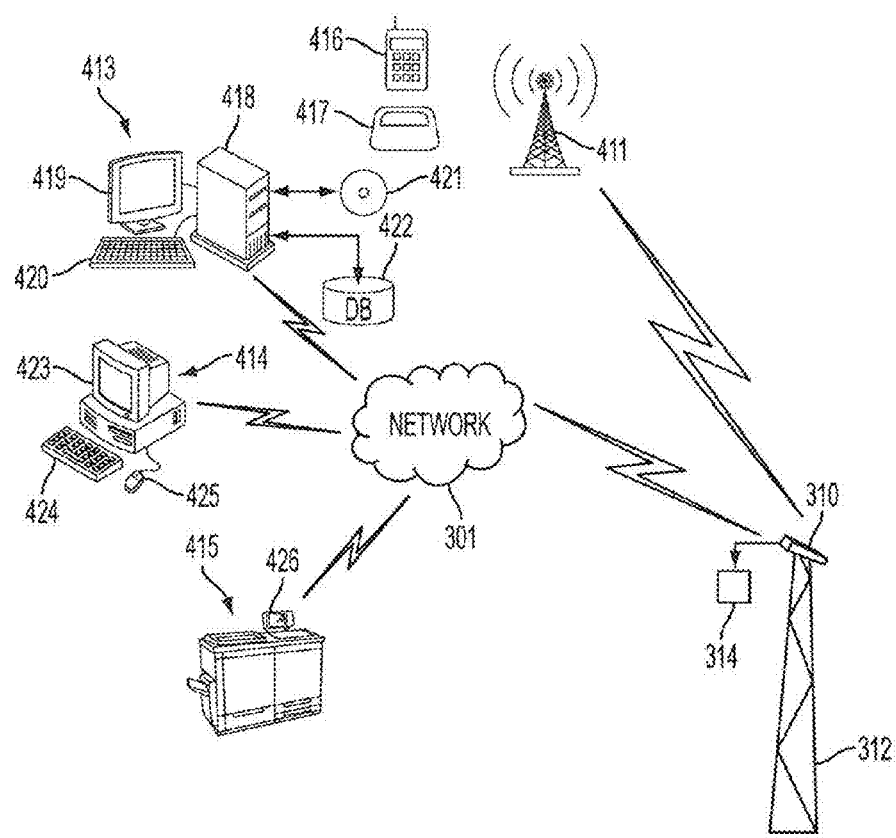
FIG. 4 illustrates the embodiment of FIG. 3 wherein further aspects of the present system are shown and described.

FIG. 4 illustrates the embodiment of FIG. 3 wherein further aspects of the present system are shown and described. It should be readily apparent to one of ordinary skill in the art that the system depicted in FIG. 4 represents a generalized schematic illustration and that other components/devices can be added, removed, or modified.

Referring to FIG. 4, camera system 310 and controller 314 may incorporate wired and/or wireless elements and may be connected via other means such as cables, radio, or any other manner for communicating known in the arts. Network 301 can receive signals transmitted from tower 411 and wireless communicates those signals to any of: workstation 413, graphical display device 414, and/or multi-function print system device 415. Signal transmission system 411 is also in wireless communication with handheld cellular device 416 and tablet 417. Workstations 413 and 414 are in communication with each other and multi-function document reproduction device 415 over network 301 including devices 416 and 417 and IR camera system 310 and controller 314. Such a networked environment may be wholly incorporated within the confines of a signal building or may be distributed to different locations throughout a widely dispersed network. Data is transferred in the form of signals which may be, for example, electronic, electromagnetic, optical, light, or other signals. These signals are provided to a communications device such as a server, which transmits and receives data packets by means of a wire, cable, fiber optic, phone line, cellular link, radio frequency (RF), satellite, or other medium or communications pathway.

Computer workstation 413 is shown comprising a computer case 418 housing a motherboard, CPU, memory, interface, storage device, and a network card. The computer system may also include monitor 419 such as a CRT, LCD, or touchscreen device. An alphanumeric keyboard 420 and mouse (not shown) may effectuate a user input. Computer readable media 421 carries machine readable program instructions for implementing various aspects of the present method. Workstation 413 communicates with database 422 wherein various records are stored, manipulated, and retrieved in response to a query. Although the database is shown as an external device, the database may be internal to computer case 418 mounted on the hard disk therein. A record refers to any data structure capable of containing information which can be indexed, stored, searched, and retrieved in response to a query, as are well established in the software arts. The workstation is capable of running a server or housing server hardware for hosting installed applications. The workstation is capable of creating and running service proxies for directing requests for applications from a client device to the platform hosting the requested application and for redirecting responses from a host device to a requesting client device. The workstation may act as a server to processors resident aboard the controller 314 or the camera system 310. Workstation 413 may be any of a laptop, server, mainframe, or the like.

Workstation 414 is shown comprising display device 423 for the presentation of various captured images thereon for a visual review by a user or technician of the systems of FIGS. 3 and 4 using keyboard 424 and mouse 425. The keyboard and mouse further enables a user to manipulate any aspects of the images captured in accordance with the present teachings.

Document reproduction device 415 is shown comprising a color marking device having a user interface 426 for the visual display of images and for enabling the user to configure the print system device to any of a plurality of device specific settings. Printer 415 may be used to reduce one or more of the captured video images and/or one or more of the reconstructed video images to a hardcopy print. The hardcopy print can be provided, for example, to the motorist as evidence of the speed violation. All of the devices of FIG. 4 collectively form a network. It should be appreciated that any of the devices shown in FIG. 4 can be placed in communication with any of the other devices of FIG. 4 shown in the networked configuration.

Figure 5:
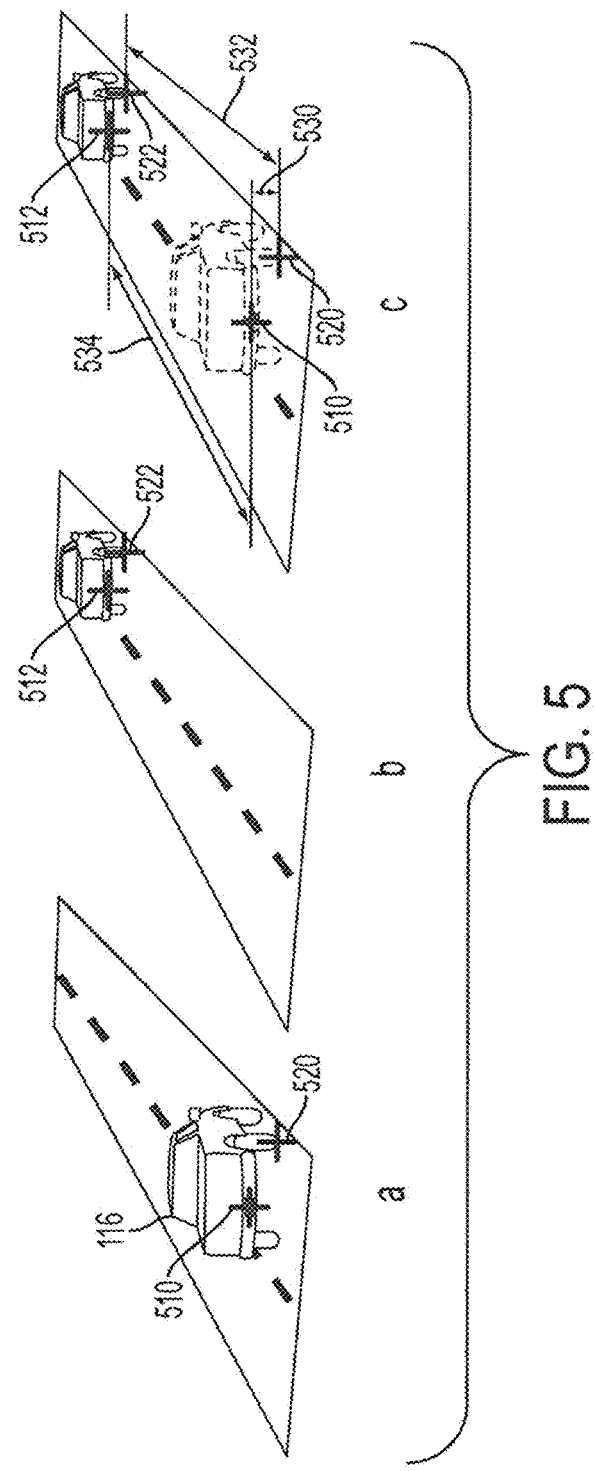
FIG. 5, which is a series of three related

FIG. 5, which is a series of three related FIGS. 5*a*, 5*b*, and 5*c*, shows two example images captured at different times of a moving target vehicle using the system of FIGS. 3 and 4. It should be readily apparent to one of ordinary skill in the art that the system depicted in FIG. 5 represents a generalized schematic illustration and that other components/devices can be added, removed, or modified.

FIG. 5*a* and 5*b* show two images captured of a target vehicle 116 traveling on a road 304, using the imaging system shown and discussed with respect to the embodiments of FIGS. 3 and 4. The images may be still images that are captured at different times, or they may be separate frames taken from a video sequence. Using standard calibration procedures, pixels within these images may be converted to real-world coordinates. However, since a 3-dimensional real-world scene is projected onto a 2-dimensional image, there is inherently some loss of information, unless a stereo imaging system is used, wherein pairs of images from two different positions are captured. The discussion here is limited to non-stereo images. Using procedures known in the art, it is possible to uniquely determine two of the dimensions if the third dimension is known. For example, if the height (z-axis) of a feature is known, the coordinates along the other two axes (x- and y-axes) can be computed.

Therefore, by selecting a feature on the vehicle of known height, it is possible to compute the (x, y) coordinates of that feature. While any clearly-defined feature of the target vehicle may be used, it is common to use a corner of the vehicle's license plate, since this feature is present on virtually all vehicles, and is easily extracted automatically from the image using standard machine-vision algorithms. The top left corner of the license plate is shown marked by a cross-hair pattern 510 in FIG. 5*a* and correspondingly by the cross-hair pattern 512 in FIG. 5*b*. These two images are superposed in FIG. 5*c*. If the height 532 of this feature (510, 512) is known, the (x, y) coordinates can be computed in each of the two images, and from these coordinates, the distance traveled 532 can be determined. Since the time interval between the two images is known accurately, it is possible to calculate the speed of the target vehicle 116, by dividing the distance by the time.

The accuracy of the resultant calculated speed is dependent on the accuracy with which the height 532 of the feature is known. The height of the license plate can vary significantly from one vehicle to the next, for example, the license plate can be mounted at one height on an SUV and on a very different height on a sports car. Consequently, if an average height is assumed, it may be in significant error, resulting in significant error in the calculated speed of the vehicle. Other features than the license plate may be used, but they all suffer from the same variability. One way to avoid this variability is to use as the tracked feature the point of contact (520, 522) of a tire of the vehicle with the road. This feature, uniquely, is always at zero height for all vehicles, and can therefore provide accurate speed calculations. Another way is to determine the height of the tracked feature (e.g. license plate) based on camera calibration information and its relative position to the tire-road contact point and then use the determined height to refine the raw speed calculated by the trajectory of the tracked feature, which is the preferred method in the invention. The reason of using detected tire-road contact point indirectly for determining track feature height rather than direct for speed calculation is tracking performance is general better using other feature (more texture for robust tracking) than tire-road contact points but it requires the knowledge of its height to be more accurate (where the tire-road contact points can contribute).

In one embodiment, more than two images are used to calculate the speed of a given target vehicle 116, in order to reduce measurement noise. For example, it is usually desirable to calculate the coordinates of a desired feature over several points in time, and to estimate the average speed of the vehicle from the plurality of coordinates. This is particularly true for curved roads or in cases where the vehicle changes lanes.

Although the use of the point of contact (520, 522) of a tire of the vehicle with the road as a zero-height feature enables more accurate speed measurement, in practice, it is often difficult to automatically and reliably extract the point of contact using visible light images. This is due to the low image contrast that can exist between the tire and the road, in particular an asphalt road, since often both the tire and the road are black. This problem is accentuated in conditions of extreme weather and at night. It is thus the objective of the proposed image algorithm to overcome the difficulty of low contrast due to a limited imaging system and detect these contact points reliably.

The point of contact (520, 522) of a tire of the vehicle with the road can be determined using the following approach. First, one or more features of the vehicle can be identified in one or more the images or in the video sequence captured by the camera system. These features, for example, but not limited to a license plate and one or more lights fixtures of the vehicle, can be chosen based, at least in part, on their ease of being detected in the IR images and to their proximity to the tires of the vehicle. Next, a search range, within the captured images, for the tires based on the detected features can be determined. For example, one feature of the vehicle, such as the license plate, may be more easily identifiable than another feature, such as the light fixtures, so that that more easily identifiable feature, the license plate in this example, can be used to assist in identify the other features of the vehicle, the light fixtures, by reducing the search area in the images. Next, the tire positions in each image can be determined, based on, at least in part, on the identified one or more vehicle features. The tire detection result can be verified by comparing the tires and license plate positions for the image sequence and outlier result can be detected and eliminated from further consideration. Finally, the vehicle speed from the tire positions can be estimated.

Figure 6:
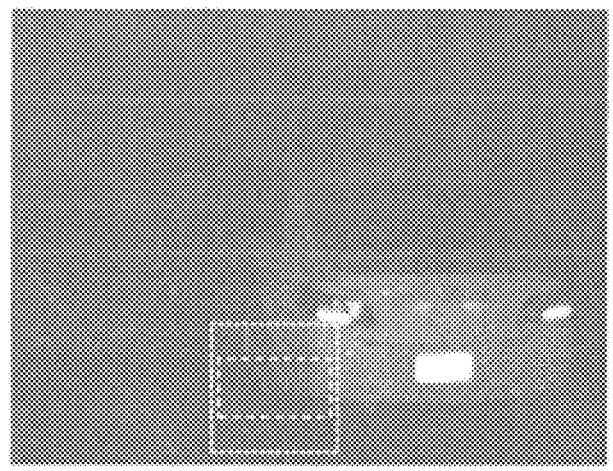
FIG. 6 illustrates example search ranges of vehicle features in accordance with aspects of the present disclosure.

FIG. 6 illustrates example search ranges of vehicle features in accordance with aspects of the present disclosure. Of the various features of a vehicle, the license plate can usually be reliably identified or detected in the still or video images and its trajectory in the images is approximately linearly correlated with that of the tires. Similar to the license plate, the lights of vehicles typically exhibit exceptional brightness under near-IR illumination, both during day and at night, due to their strong reflectance, which make them easily detectable with high accuracy. The relative 3-D positions between lights and tires of a vehicle vary often in a relatively small range, even for different vehicles. This is reflected in their 2-D images. For example, in a vehicle viewed from the left rear side as illustrated in FIG. 6 from a 15 ft pole, the rear tire appears almost always in the range shown as the boxes (the left corner of the tire/road interface lies below and to the left of the lower left corner of the light). Using the plate location information, this range can be further trimmed (show in FIG. 6 as the dotted box), as the interface is also below the plate.

Figure 7:
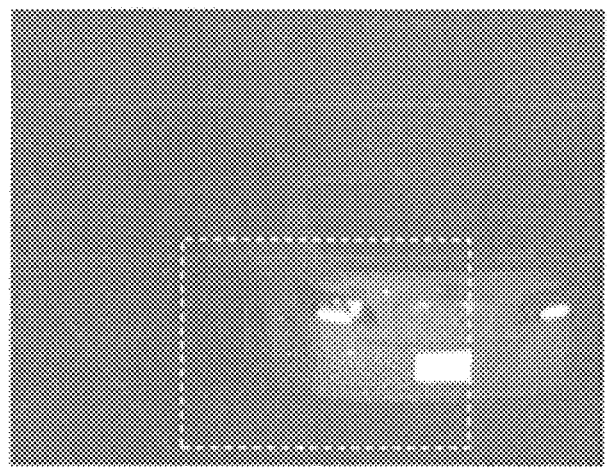
FIG. 7 illustrates another example search range of vehicle features in accordance with aspects of the present disclosure.

The identification of the license plate and the light fixtures of the vehicle within the image can be performed using a variety of methods since the these feature often appear as the brightest objects under near-IR illumination due to their high-reflectance. By way of a non-limiting example, the identification can employ an algorithm to search for the brightest area in a predetermined region from the license plate within the image, which is illustrated in FIG. 7. To make the results more reliable, both the left and the right light fixtures can be used in the identification procedure where only the paired results that have similar y-coordinates and have x-coordinate difference within certain range are selected.

The search range of a tire can be determined relative to the light fixture and/or license plate position. The range can be calculated from the camera geometry and the geometry of all vehicles of interest. It can also be determined by training, specifically, taking the pictures of the vehicles and measuring the relative positions of the lights and the tires. The relative positions between the plate and the lights can also be determined in a similar manner. Additionally, the motion blobs, region with motion greater than a threshold, derived from the vehicle detection and tracking module can be used to limit the search of tire, plate, tail lights etc.

The tire can be detected in the range specified by the detected or identified light fixture and/or license plate position in the captured image. The bottom part of a tire can be roughly modeled as shown in FIG. 8. The exact shape and size of the tire in the image depend on its relative position to the camera. However, other than the tire width, the variation is usually small. FIG. 9 shows the image of another tire. Although the tires of FIGS. 8 and 9 are taken from very different vehicles (one from a sedan and one from an SUV) running on different lanes, the difference is relatively small (other than the tire width). In addition, it is possible to apply multiple models to the different parts of the image.

The tire can be located as a three step procedure. First, the input image is correlated to three templates shown in FIG. 10, each detecting one step-edge (templates a, b and c detect the left, right and bottom edges, respectively). Second, two lower corners are detected (spots shown in FIG. 8a). This is achieved by combining the correlation results obtained from template c with templates a, and b, respectively. Specifically, they are combined as:

$$\text{corner\_}ca(x,y)=\min[ca(x,y),cc(x,y)] \text{ and}$$

$$\text{corner\_}cb(x,y)=\min[cb(x,y),cc(x,y)],$$

where corner_ca(x,y) and corner_cb(x,y) are the scores for detection of left and right corners, respectively, and ca(x,y), cb(x,y) and cc(x, y) are the correlation results obtained from the first step for template a, b and c, respectively. In the last step, corner_ca(x,y) and corner_cb(x,y) are combined under different tire width assumptions. The tire is detected by maximizing the combined score.

Specifically, $$(\text{tire\_}x,\text{tire\_}y,\text{tire\_}w)=\arg\max_{x,y,w}[\text{corner\_}ca(x,y)+\text{corner\_}cb(x+w;y)],$$

where tire_x, tire_y are the detected tire (left corner) coordinate and tire_w is the tire width, and w is optimized for all possible tire width.

Figure 11:
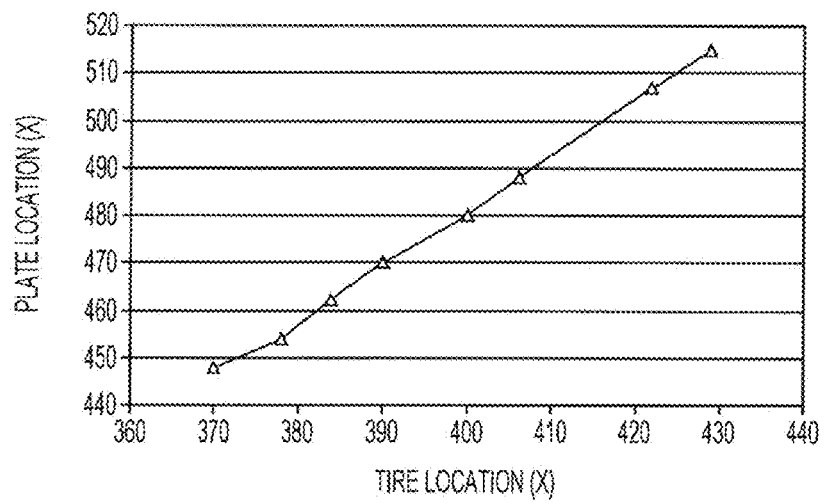
FIG. 11 shows a plot of the linear correlation between the tire and the license plate positions (in x-coordinates).
Figure 12:
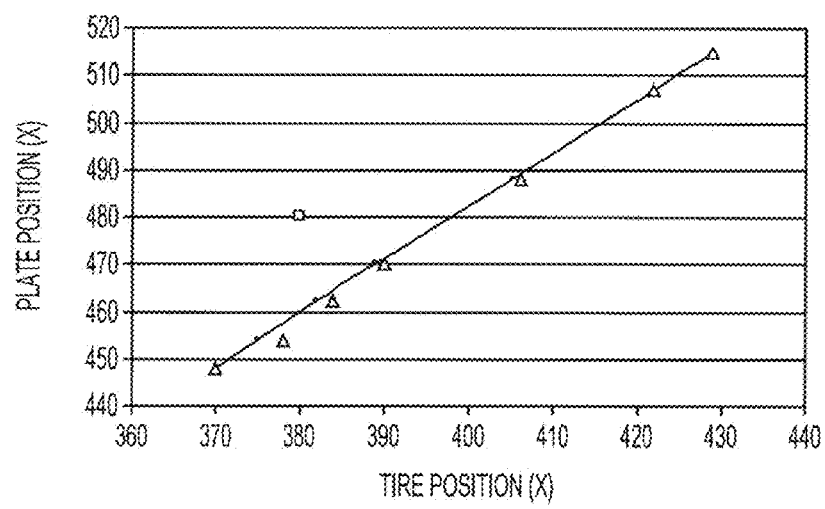
FIG. 12 shows a plot of the linear correlation between the tire and the license plate positions (in x-coordinates) with outlines (dots) detected.

The trajectories of the plate and the tires are usually linearly correlated. This is shown in FIG. 11, where the x-coordinates of the plate and the left rear tire are plotted for a video sequence (the y-coordinates show a similar behavior). When tires are detected, two linear fittings can be performed between tire and plate positions, one for the x-coordinates, and one for the y-coordinates, for the video sequence. The outliers of the fitting, which represent greater errors in tire detection can be easily spotted and excluded from the speed detection. This is illustrated in FIG. 12, where the tire detection result at (plate location) 480 is determined to be an outlier, and is not used in speed detection.

Once the 2-D position of the tire in the image is determined, its 3-D position can be calculated from the camera geometry using known methods, for example, using a pinhole camera model such as described in D. H. Ballard & C. M. Brown, "Computer Vision", Prentice-Hall, Inc pp. 482-484. The average speed of the vehicle between two different times can be evaluated from the distance traveled. Alternatively, we can use the relative position of tire-road contact point and the track feature (e.g. license plate) of each frame and the camera calibration to determine the height of the tracked feature. After that, the determined height is used to refine the raw speed calculated from the trajectory of the track feature. With this method, the detected tire-road contact points over multiple frames are used only indirectly to determine the height of the tracked feature rather than used for speed calculation directly. This has the benefit of reduce the impact of noisy detection of tire-road contact points to the final speed calculation.

To demonstrate the initial performance of the present method, a system was implemented and tested under a controlled environment. In the experiment, the camera was mounted on a pole for 3 days. Each day multiple runs of multiple vehicles (thus multiple plate heights that need to be estimated live by detecting tire locations) at various target speeds (30, 45, and 60 mph) were video-taped with the camera daily. A reference speed measurement system (Lidarbased) was used to obtain the ground truth speeds for each vehicle video-taped. These videos are then analyzed by a video-based speed detection algorithm and the results were compared to the ground truths from the reference instruments.

Figure 13:
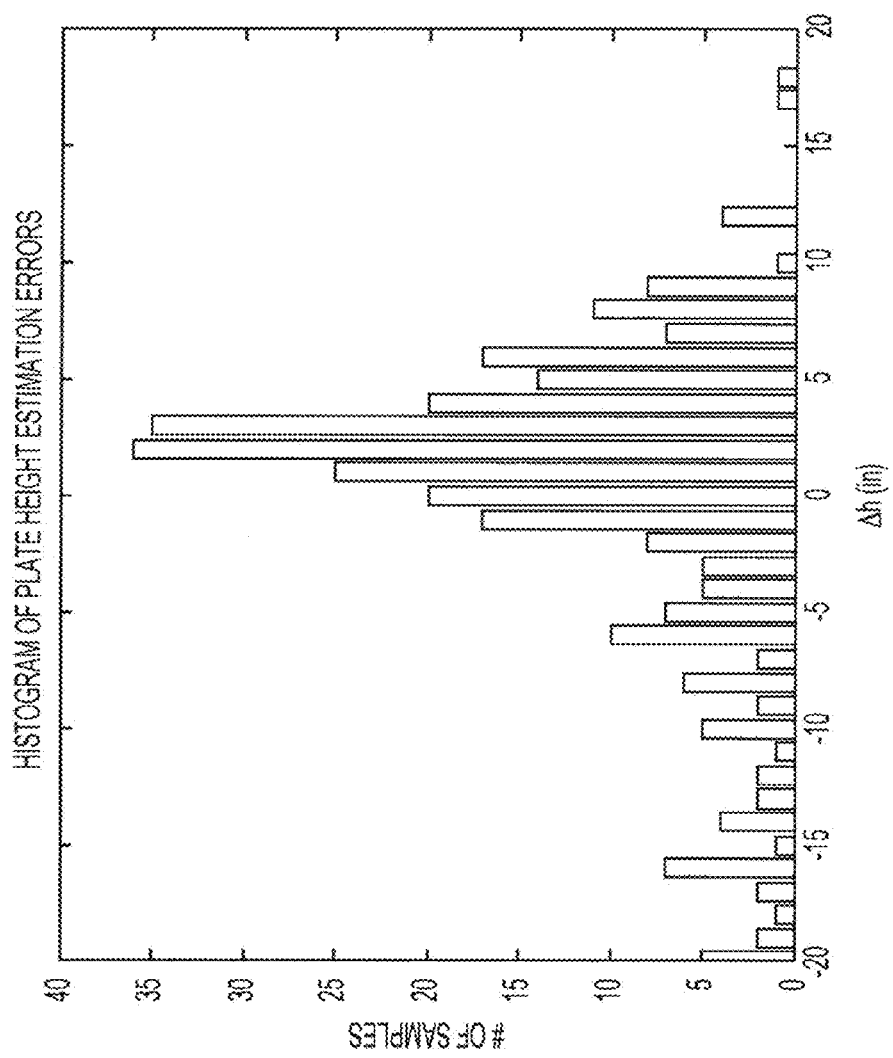
FIG. 13 shows a histogram of plate heights estimation errors result from experiments using the present system and method.
Figure 14A:
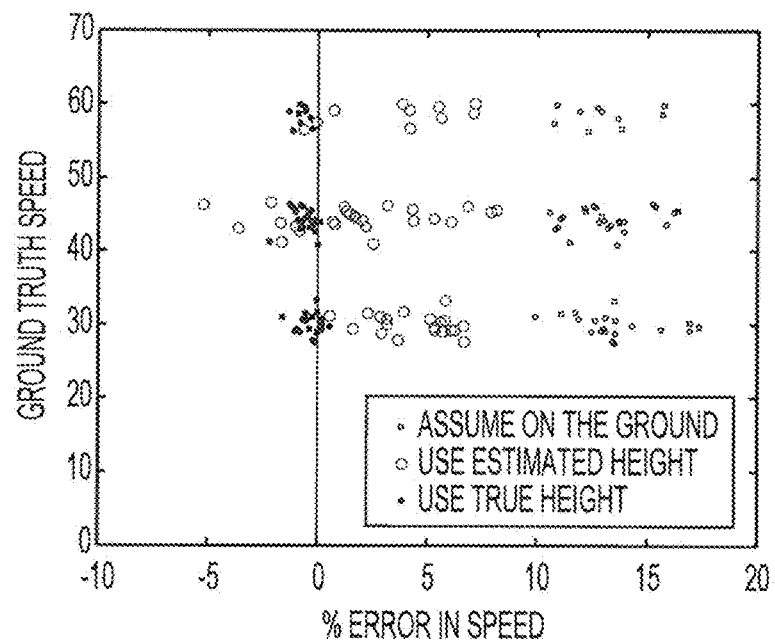
FIGS. 14a, 14b, and 14c, shows plots of speed estimation errors using the present system and method as a means to estimate tracked feature heights for speed correction.
Figure 14B:
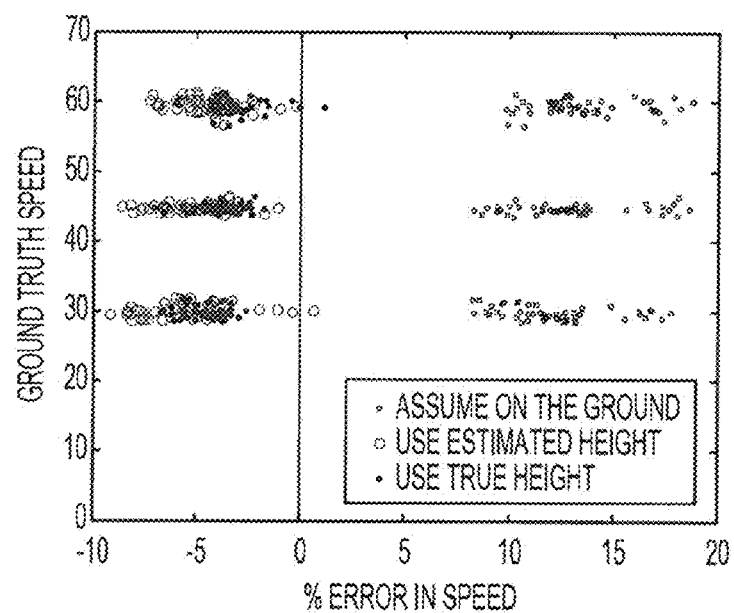
Figure 14C:
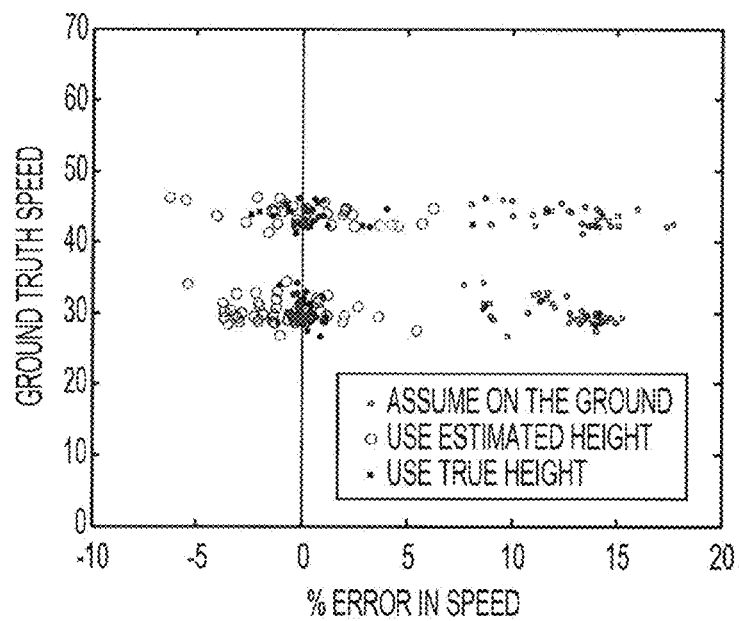

The experiments showed the effectiveness and accuracy of the plate height estimation method. Since this was a controlled test, the actual plate heights of each vehicle were determined and compared with the accuracy of the plate height estimations of the present method and the resulting accuracy of speed detection with or without plate height estimation. The results for plate height estimation errors using current method are shown in FIG. 13. For a camera mounted at 25 ft above the ground, the plate estimation errors would be limited to be within ±3 inches so that the impact to speed accuracy is within ±1%. Experiments showed that this can be achieved for about 44% of the time. The results for the assessment of its bottom-line impact on speed accuracy are shown in FIG. 14. Ideally, all points would have a 0% speed error (the black line in the FIGS. 14a, 14b, and 14c). Experiments showed using this present method as a mean to estimate tracked feature height and thus improve speed measurement, the performance is about ±5% errors for 95 percentile range, which is good for applications where the requirement for speed accuracy allows about ±5% error.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method for determining the speed of a motor vehicle in a vehicle speed detection system, the method comprising:
   receiving a plurality of images of a motor vehicle traveling on a road, each of the images being separated in time by a known interval;
   determining, for each of at least two of the images, a position of a license plate, a light fixture on the vehicle, or both the license plate and the light fixture on the vehicle;
   determining, for each of at least two of the images, a point of contact where a same tire of the vehicle contacts a surface of the road based, in part, on one or more identified features of the vehicle in one or more of the plurality of images based on the position of the license plate, the light fixture on the vehicle, or both the license plate and the light fixture on the vehicle that was determined; and
   using the points of contact and the time interval separations to calculate a speed at which the vehicle is traveling on the road.

2. The method according to claim 1, wherein determining the point of contact comprises:
   determining a first two-dimensional estimated position at a first time at which a tire of the vehicle contacts a surface upon which it is situated in a first frame of a video image taken with a camera;
   calculating a first three-dimensional position at the first time based on the two-dimensional position using a geometry of the camera with respect to the vehicle;
   determining a second two-dimensional estimated position at a second time at which the tire of the vehicle contacts the surface in a second frame of the video image;
   calculating a second three-dimensional position at the second time based on the second two-dimensional position using the geometry of the camera with respect to the vehicle; and
   determining the estimated speed at which the vehicle is traveling using the first and the second three-dimensional positions and a time difference between which the first and the second two-dimensional positions were estimated.

3. The method according to claim 2, further comprising determining a first edge, a second edge, or both the first edge and the second edge of the tire to determine the first two-dimensional estimated position.

4. The method according to claim 2, wherein the first two-dimensional estimated position is determined based, at least in part, on the position of the license plate, the light fixture, or both the license plate and the light fixture of the vehicle.

5. The method according to claim 1, wherein the camera is operable to detect radiation in a near infrared portion of the spectrum.

6. The method according to claim 1, wherein the images comprise any of: still images captured at known time intervals, and video images captured at a known frame rate.

7. The method according to claim 1, further comprising calibrating the camera such that pixel locations of the captured images are known relative to real world coordinates.

8. The method according to claim 1, further comprising:
   analyzing more than two images of the vehicle using contact points determined for each of a plurality of images over a plurality of time intervals; and
   determining at least one of a mean speed, a median speed, a maximum speed and a minimum speed, for the vehicle from the analysis of more than two images.

9. The method according to claim 1, further comprising determining a time-varying speed for the vehicle using at least some of the images.

10. A system for determining the speed of a motor vehicle in a vehicle speed detection system, the system comprising:
    an imaging system; and
    a processor in communication with said video camera system and a memory, said processor executing machine readable instructions for performing:
       receiving images captured using the imaging system, each of the images being separated in time by a known interval;
       determining, for each of at least two of the images, a position of a license plate, a light fixture on the vehicle, or both the license plate and the light fixture on the vehicle;
       determining, for each of at least two of the images, a point of contact where a same tire of the vehicle contacts a surface of the road based on the position of the license plate, the light fixture on the vehicle, or both the license plate and the light fixture on the vehicle that was determined;

using the points of contact and the time interval separations to calculate a speed at which the vehicle is traveling on the road.

11. The system of claim 10, wherein the images comprise any of still images captured at known time intervals, and video images captured at a known frame rate.

12. The system of claim 10, further comprising calibrating the camera such that pixel locations of the captured images are known relative to real world coordinates.

13. The system of claim 10, further comprising:
analyzing more than two images of the vehicle using contact points determined for each of a plurality of images over a plurality of time intervals; and
determining at least one of a mean speed, a median speed, a maximum speed and a minimum speed, for the vehicle from the analysis of more than two images.

14. The system of claim 10, further comprising determining a time-varying speed for the vehicle using at least some of the images.

15. A computer implemented method for determining the speed of a motor vehicle in a vehicle speed detection system, the method comprising:
receiving a plurality of images of a moving vehicle, the images captured at known time intervals with each of the images being separated in time by a known interval, said images having been captured using an imaging system;
determining, for each of at least two of the images, a position of a license plate, a light fixture on the vehicle, or both the license plate and the light fixture on the vehicle;
determining, for each of at least two of the images, a point of contact where a same tire of the vehicle contacts a surface of the road based on the position of the license plate, the light fixture on the vehicle, or both the license plate and the light fixture on the vehicle that was determined;
using the points of contact and the time interval separations to calculate a speed at which the vehicle is traveling on the road.

16. The computer implemented method of claim 15, further comprising calibrating the camera such that pixel locations of the captured images are known relative to real world coordinates.

17. The computer implemented method of claim 15, further comprising:
calculating a plurality of speeds for the vehicle using contact points determined for each of a plurality of images over a plurality of time intervals; and
determining an average speed for the vehicle from the plurality of speeds.

18. The computer implemented method of claim 15, further comprising determining a time-varying speed for the vehicle using at least a portion of the plurality of images.

* * * * *